United States Patent
Mulford et al.

[11] Patent Number: 5,991,901
[45] Date of Patent: Nov. 23, 1999

[54] INDICATION OF COVERAGE AREA LIMITS WITHIN DIGITAL COMMUNICATION SYSTEMS

[75] Inventors: Keith Irl Mulford, Arlington Heights; Thomas Joseph McClaughry, Hoffman Estates, both of Ill.; Gary Wayne Persinotti, Elizabethtown, Pa.

[73] Assignee: Motorola, Inc., Schaumburg, Ill.

[21] Appl. No.: 08/292,700

[22] Filed: Aug. 19, 1994

Related U.S. Application Data

[63] Continuation-in-part of application No. 08/016,445, Feb. 11, 1993, abandoned.

[51] Int. Cl.[6] .............................. G06F 11/00; H04Q 7/00; H04Q 9/00
[52] U.S. Cl. ............................................ 714/704; 455/421
[58] Field of Search ..................... 371/5.1, 5.5; 455/33.2, 455/54.1, 56.1, 421, 422, 423; 379/60

[56] References Cited

U.S. PATENT DOCUMENTS

| | | | |
|---|---|---|---|
| 4,718,081 | 1/1988 | Brenig | 379/60 |
| 4,996,715 | 2/1991 | Marui et al. | 455/33.2 |
| 5,070,536 | 12/1991 | Mahany et al. | 455/67.4 |
| 5,097,507 | 3/1992 | Zinser et al. | 381/31 |
| 5,134,708 | 7/1992 | Marui et al. | 455/33.2 |
| 5,175,867 | 12/1992 | Wejke et al. | 455/33.1 |
| 5,214,687 | 5/1993 | Känsäkoski et al. | 379/60 |
| 5,325,397 | 6/1994 | Scholz | 375/10 |
| 5,327,575 | 7/1994 | Menich et al. | 455/33.2 |
| 5,327,576 | 7/1994 | Uddenfeldt et al. | 455/33.2 |
| 5,355,514 | 10/1994 | Borg | 455/33.1 |
| 5,373,548 | 12/1994 | McCarthy | 379/63 |
| 5,375,123 | 12/1994 | Andersson et al. | 370/95.1 |
| 5,379,446 | 1/1995 | Murase | 455/33.2 |
| 5,379,447 | 1/1995 | Bonta et al. | 455/33.2 |
| 5,384,791 | 1/1995 | Klein | 371/5.1 |
| 5,390,339 | 2/1995 | Bruckert et al. | 455/33.2 |
| 5,483,690 | 1/1996 | Schroder | 455/226.1 |
| 5,732,347 | 3/1998 | Bartle et al. | 455/421 |

*Primary Examiner*—Robert W. Beausoliel, Jr.
*Assistant Examiner*—Scott T. Baderman
*Attorney, Agent, or Firm*—Susan L. Lukasik

[57] ABSTRACT

A digital radio frequency ("RF") communication unit (103, 104) measures digital signal quality based on received signal strength information ("RSSI") and/or bit error rate ("BER") information. The RSSI and/or BER information are compared with a predetermined threshold. If the predetermined threshold is exceeded, then simulated RF channel noise is injected into the speaker path during unvoiced periods in the message at a level which indicates the RF signal quality to warn the user of the digital communication unit that the outer limits of a given coverage area are being approached.

8 Claims, 4 Drawing Sheets

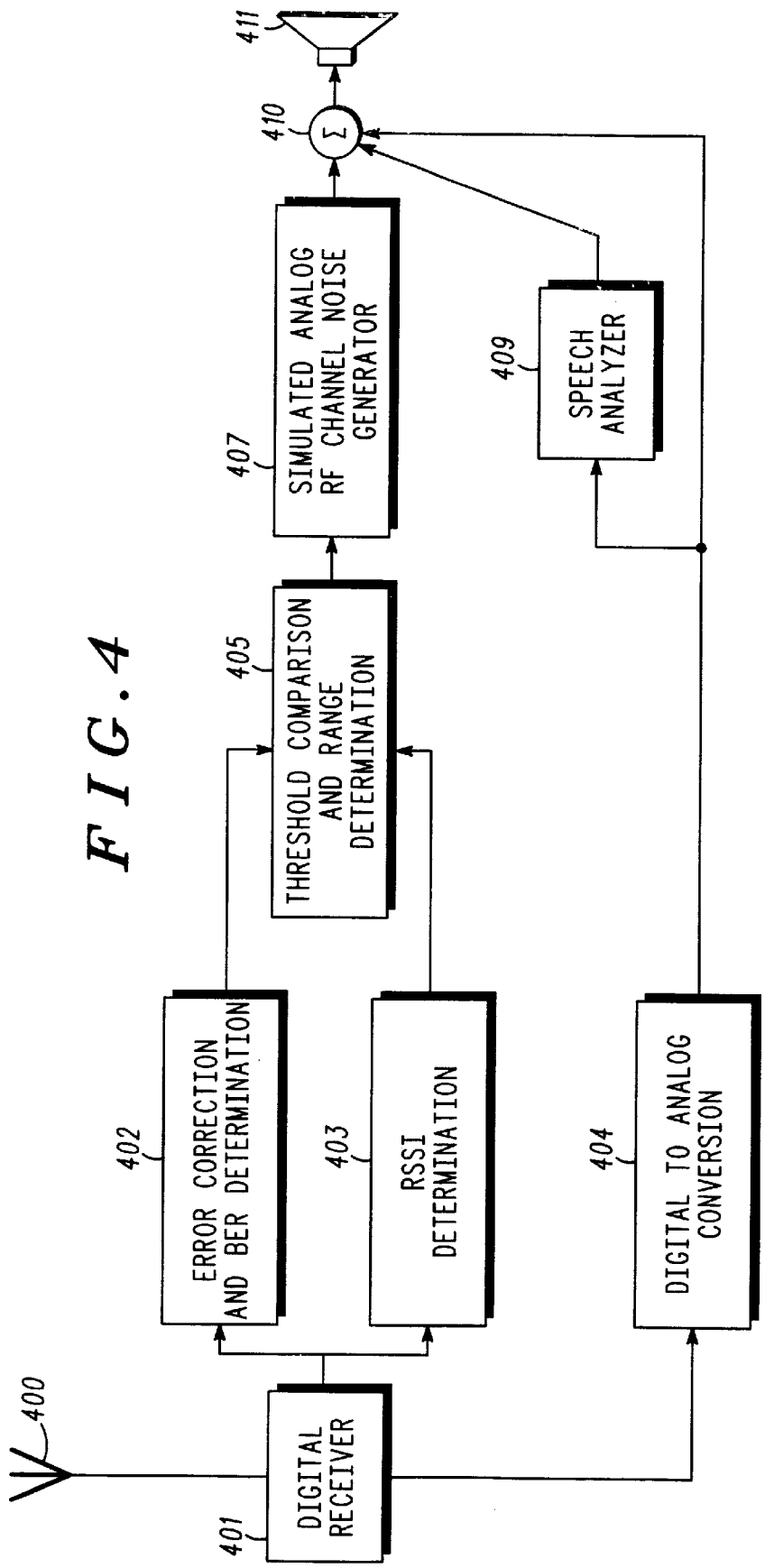

INDICATION OF COVERAGE AREA LIMITS WITHIN DIGITAL COMMUNICATION SYSTEMS

CROSS-REFERENCE TO RELATED APPLICATION

This is a continuation-in-part of prior application Ser. No. 08/016,445, filed Feb. 11, 1993, now abandoned, by Keith I. Mulford et al., the same inventive entity as in the present application, which prior application is assigned to Motorola, Inc., the same assignee as in the present application, and which prior application is hereby incorporated by reference verbatim, with the same effect as though the prior application were fully and completely set forth herein.

FIELD OF THE INVENTION

The present invention relates generally to digital communication systems, and in particular, to indicating coverage area limits.

BACKGROUND OF THE INVENTION

In general, communication systems can be separated into two types: analog and digital. Each type of communication system comprises at least a plurality of communication units and a limited number of communication channels transceived by repeaters. Analog and digital communication systems differ in their information representations, and hence, the manner in which information (particularly audio information) is transceived.

Within an analog transmitter, an analog waveform is used to directly modulate an RF (radio frequency) channel. When the modulated RF channel is received by an analog receiver, the analog waveform is recovered, with the possible addition of noise incurred by the RF channel itself. Within a digital transmitter, an analog waveform is typically sampled to create a continuous stream of digital data, which is then used to modulate an RF channel. When the digitally modulated RF channel is received by a digital receiver, the digital data is recovered. The noise inherent to the RF channel is reflected as errors in the recovered digital data, and thus, is present when the analog waveform is reconstructed from the recovered digital data.

To substantially eliminate noise from being reconstructed, error correction codes are used. Error correction codes provide protection against errors by creating redundancy for the data being transmitted. This redundancy takes the form of additional bits appended to the data, often called parity bits. Prior to transmission over a communication channel, the data is passed through a known encoding function which generates a unique code word, composed of the original data and its parity bits. The code word is then transmitted, via the communication channel, to a receiver. The receiver passes the received code word through a decoding function which will use the parity bits to determine if any errors have occurred in the digital data. Depending on the encoding/ decoding function used, a finite number of errors within the data can be detected and corrected, leading to a reduced distortion in the reconstructed analog waveform. By detecting the number of errors which occur during a finite period of time, a bit error rate (BER) can be calculated. The error correction will cease correcting errors only when too many errors have occurred in the data, or alternately stated, when the BER is too high.

Thus, an audio message transmitted through a given RF channel in a digital error-corrected system can result in higher audio quality than the same message transmitted through the same RF channel in an analog system. Since the noise added to a message by an RF channel is directly proportional to the distance between the transmitter and the receiver, a digital error-corrected communication system can offer more uniform audio quality (i.e. less noise) over a larger portion of a given transmitter's coverage area than an analog system. However, when a digital communication unit approaches the outer limits of the transmitter's coverage area, the errors will affect the audio quality with rapidly increasing degradation. The extent of coverage improvement and the point at which audio quality rapidly degrades are both dependent upon the error correction capability of the particular error correction code used. Specifically, as the capabilities of the error correction code are increased, both the extent of coverage improvement and the point at which audio quality rapidly degrades are pushed closer to the outer limits of the coverage area.

While the provision of increased audio quality over a larger portion of a coverage area is useful in itself, it does create a problem in "fringe" coverage area determination by the user. A fringe coverage area can be defined as that portion of a transmitter's coverage area in which the increased presence of received, channel-induced, noise indicates the approaching outer limit of the coverage area. Typically, these fringe areas occur at the most distant regions relative to the transmitter's location, or the coverage area where the received signal is the weakest. Frequently, users of analog systems listen to the amount of background noise in received audio to judge the strength of the received signal, and consequently, where they are relative to the outer limits of the coverage area. A more direct measure of this can be obtained through the calculation of received signal strength information (RSSI). The use of RSSI is known for out-of- range indications in paging systems. RSSI is also used within cellular telephone systems to determine when a hand-off between cells should occur and to establish visual bar-graphs of relative signal strength as a cellular communication unit roams throughout a given coverage area. While these RSSI-based methods are useful in the indication of a low signal strength condition, current art provides an audible indication that interferes with the message. One example of such current art is U.S. Pat. No. 5,134,708 to Marui et al., granted Jul. 28, 1992, entitled "Radio Telephone Apparatus."

Within an error-corrected digital system, the error correction effectively reduces the perceptible fringe coverage areas by masking the added noise effects of reduced signal strength. This in turn leaves a user less time and distance to recognize the degradation in audio quality and thus take corrective actions which will return them to an area of improved coverage. Therefore a need exists for a method which provides an audible early indication that a user in a digital communication system is approaching the outer limits of a given coverage area, such that the received signal audio quality is not further degraded by the presence of the indicator.

BRIEF DESCRIPTION OF THE DRAWINGS

FIG. 4 illustrates a circuit in accordance with the present invention.

DESCRIPTION OF THE PREFERRED EMBODIMENT

Digital communication systems which include error correction provide a recovered voice quality versus range performance which is typically better than previous analog communication systems. Because a digital communication system can remove the naturally occurring noise from weakly received signals, communication units are unable to tell when they are approaching the end of their transmitting source's coverage area.

The present invention addresses this lack of range-related audio quality degradation by measuring the digital signal quality, via RSSI and BER information, and translating this information into a non-obtrusive audible indication to the user that they are approaching the outer limits of a given coverage area.

Figure 1:
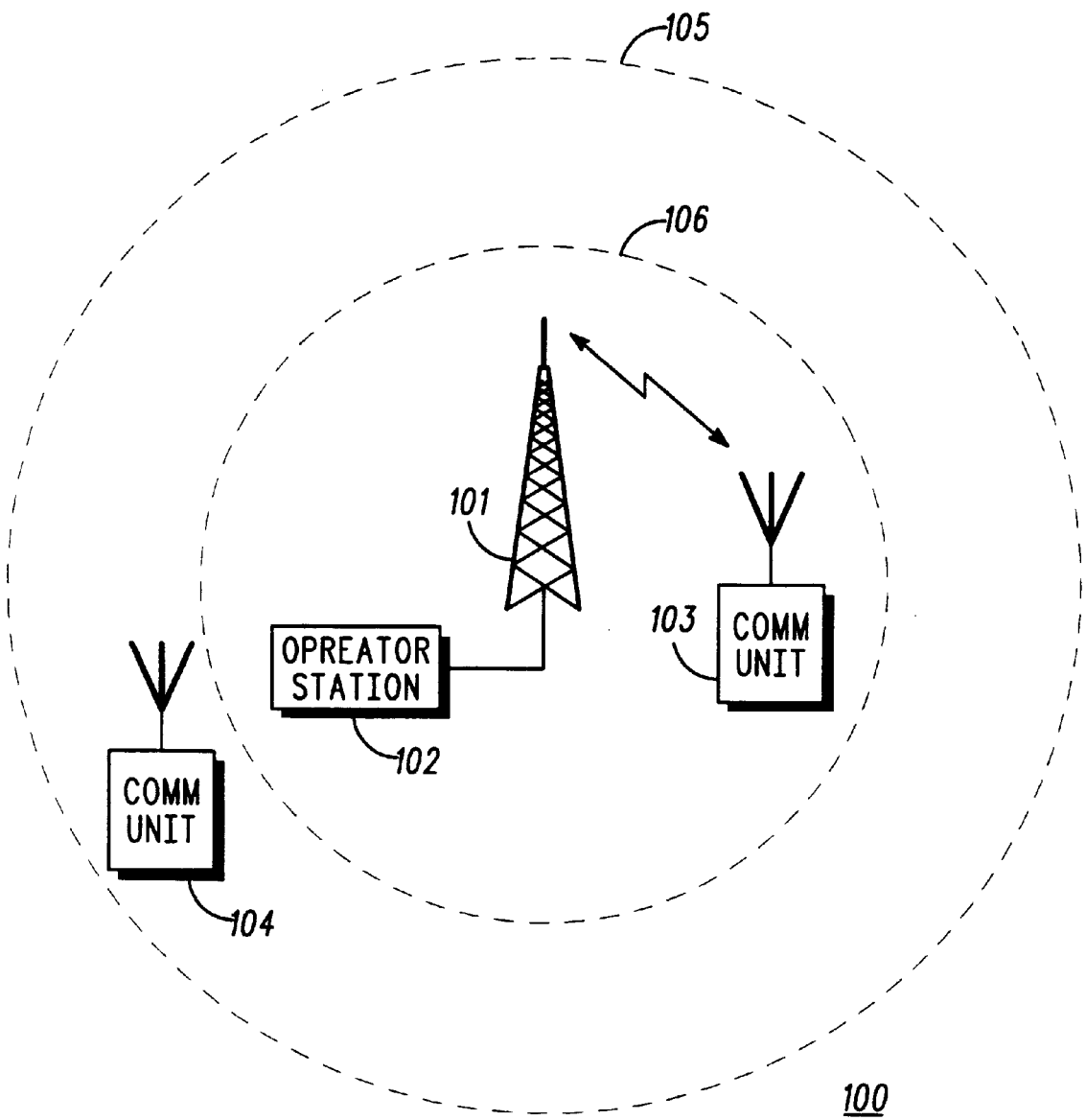
FIG. 1 illustrates a communication system in accordance with the present invention.

The present invention can be more fully described with reference to FIGS. 1–4. FIG. 1 illustrates a communication transmitting source system 100 that includes a transceiver 101, an operator station 102, communication units 103 and 104, a coverage area outer limit 105, and a coverage area inner limit 106. The transceiver 101 may comprise a base station or repeater such as a Motorola ASTRO Quantar Base/Repeater Station. The operator station 102 may comprise a console such as a Motorola Centracom or T5600 console. The communication units 103 and 104 may comprise in-hand portable or in-car mobile radios such as a Motorola ASTRO Saber Portable or a Motorola ASTRO Spectra Mobile. The area between the coverage area outer limit 105 and the coverage area inner limit 106 comprises the fringe coverage area associated with the transceiver 101. For the configuration shown, the communication unit 103 is operating within the coverage area inner limit 106 and thus does not require an indication of the approaching coverage area outer limit 105. Alternately, the communication unit 104 is operating within the fringe coverage area and thus requires an indication of the approaching coverage area outer limit 105.

Figure 2:
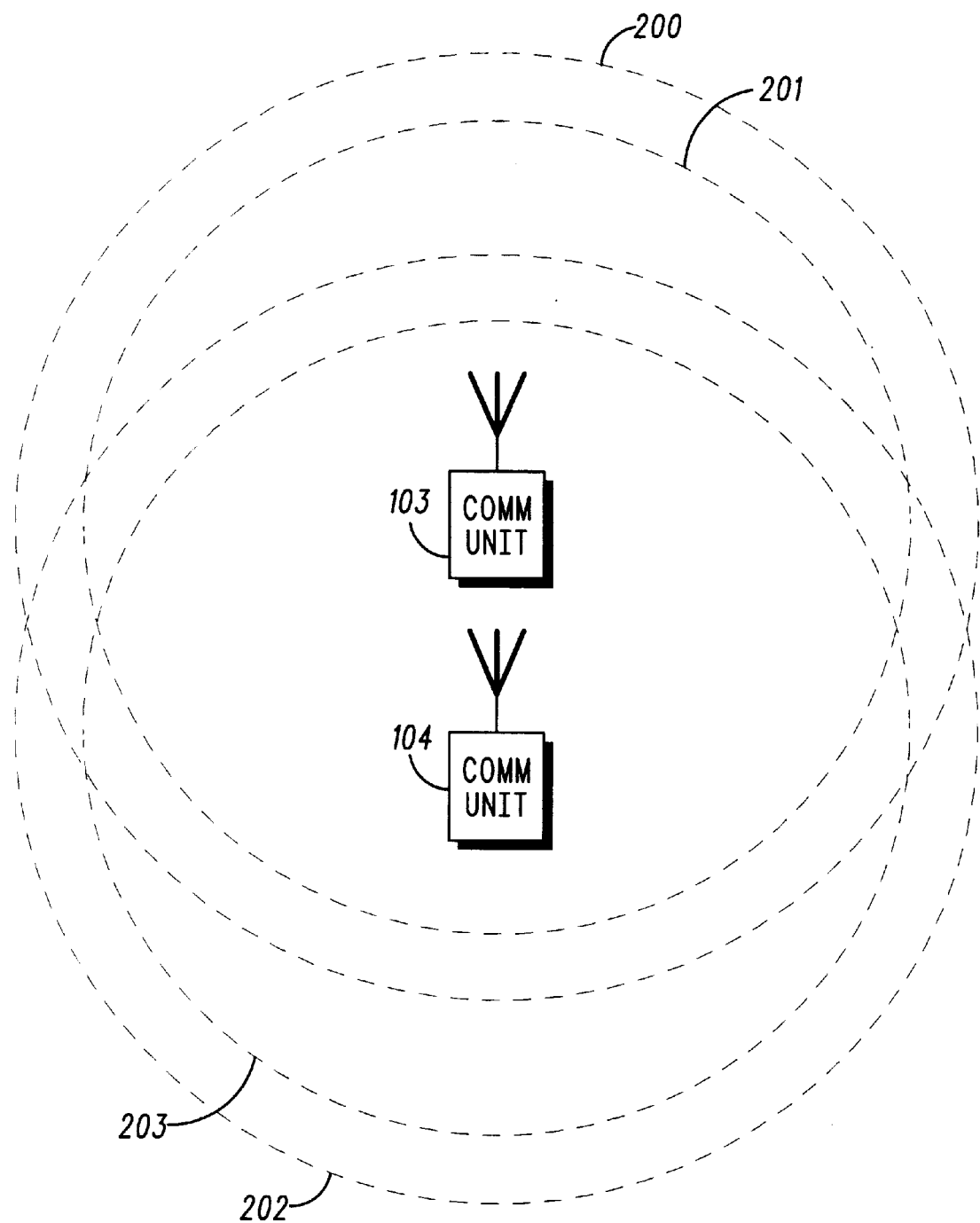
FIG. 2 illustrates an alternative communication system in accordance with the present invention.

FIG. 2 illustrates an alternative communication system that includes communication units 103 and 104, a first coverage area outer limit 200, a first coverage area inner limit 201, a second coverage area outer limit 202, and a second coverage area inner limit 203. The first coverage area outer limit 200 and the first coverage area inner limit 201 are associated with the communication unit 103. The second coverage area outer limit 202 and the second coverage area inner limit 203 are associated with the communication unit 104. The area between the first coverage area outer limit 200 and the first coverage area inner limit 201 may comprise the first fringe coverage area associated with the communication unit 103. The area between the second coverage area outer limit 202 and the second coverage area inner limit 203 may comprise the second fringe coverage area associated with the communication unit 104.

In this example, communication units 103 and 104 are operating within the coverage area inner limits 201 and 203, and hence, do not require indications of the approaching first coverage area outer limit 200 or second coverage area outer limit 202. Assuming identical coverage areas, as the communication units 103 and 104 move away from one another, they will move into the second and first fringe coverage areas, respectively, at which point indications of the approaching second coverage area outer limit 202 and first coverage area outer limit 200 will be needed.

As a final example, assume that the coverage area associated with communication unit 104 is smaller than that associated with communication unit 103. In this case, as the communication units 103 and 104 moved away from each other, the communication unit 103 would enter the second fringe coverage area, and thus require an indication of the approaching second coverage area outer limit 202, sooner than the communication unit 104 would enter the first fringe coverage area.

Figure 3:
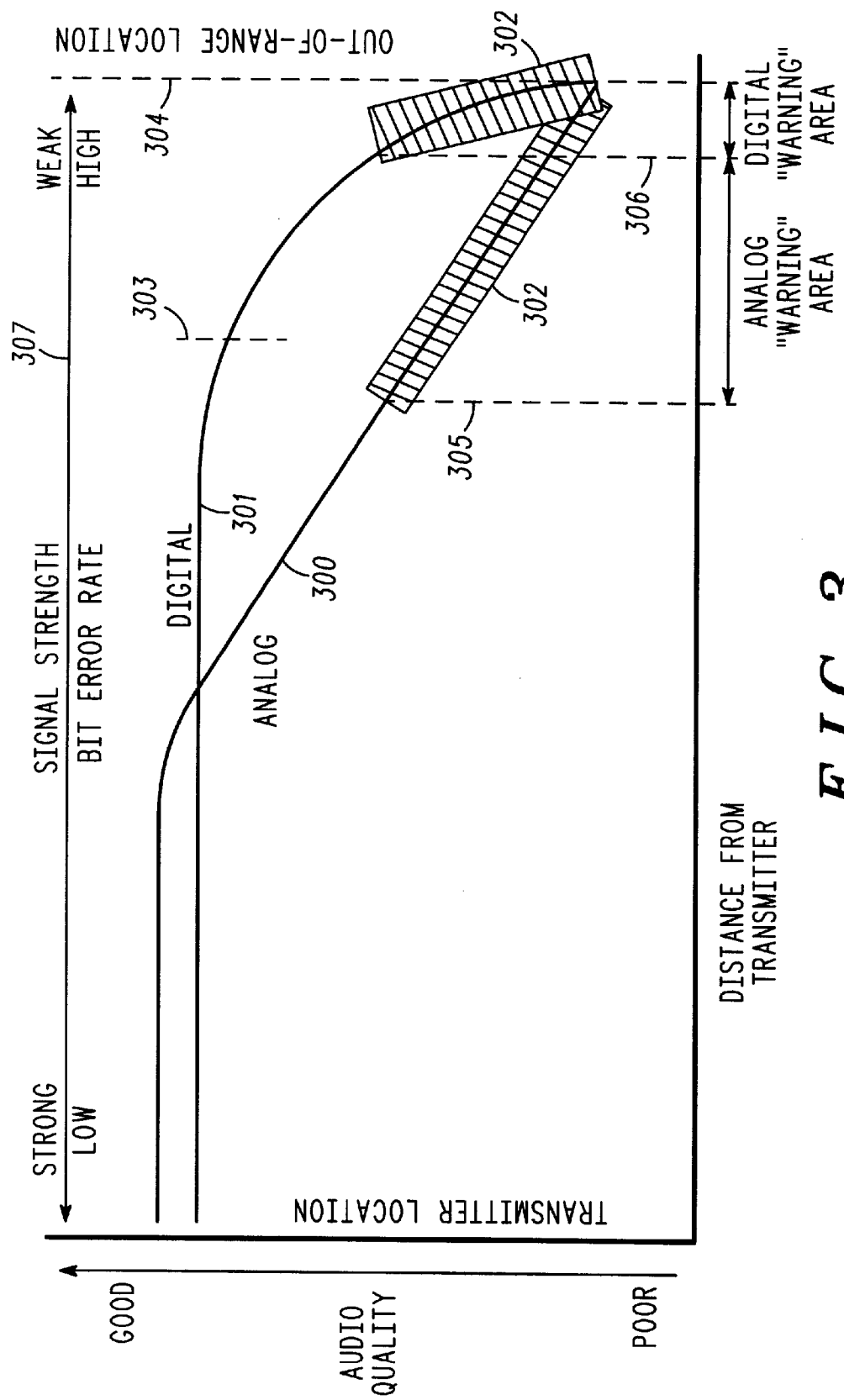
FIG. 3 illustrates relative audio quality versus distance from a transmitter for an analog and a digital communication system.

FIG. 3 illustrates relative audio quality (shown along the vertical axis) versus distance from a transmitter (shown along the horizontal axis) for an analog and digital communication system that includes an analog performance curve 300, a digital performance curve 301, area of degraded audio 302, a desired digital coverage area inner limit 303, an out-of-range location 304, an analog coverage area inner limit 305, an actual digital coverage area inner limit 306, and a relative signal strength/bit error rate indication 307. The desired digital coverage area inner limit 303 and the analog coverage area inner limit 305 are analogous to the coverage area inner limit 106, the first coverage area inner limit 201, and the second coverage area inner limit 203. As shown by the relative signal strength/bit error rate indication 307, increased distance from a transmitter leads to weakened signal strength and higher bit error rate.

In the analog case, received audio quality degrades gradually as indicated by the analog performance curve 300 until it reaches the out-of-range location 304. Upon reaching the analog coverage area inner limit 305, the area of degraded audio 302 is perceived, leading to a sense of proximity to the out-of-range location 304.

In the error-corrected digital case, received audio quality degrades gradually as indicated by the digital performance curve 301 until it reaches the out-of-range location 304. In this case, the area of degraded audio 302 is not perceived until the actual digital coverage area inner limit 306 is reached, which is significantly closer to the out-of-range location 304 and hence provides less warning. It is preferable to have an indication of the approaching out-of-range location 304 at the desired digital coverage area inner limit 303, thus providing extra time and distance to take corrective action before losing communications. The actual location of the desired digital coverage area inner limit 303 is dependent upon user requirements and can be detected through the use of RSSI and BER measurements.

FIG. 4 illustrates a circuit in accordance with the present invention comprising an antenna 400, a digital receiver 401, an error correction and BER determination function 402, an RSSI determination function 403, a digital-to-analog converter 404, a threshold comparison and range determination function 405, an analog noise generator 407, a speech analyzer 409, an audio summer 410, and a speaker 411. The digital receiver 401 may comprise any receiver capable of detecting and demodulating an RF signal to produce a digital data stream. The error correction and BER determination function 402 may comprise an known error correction code capable of detecting and correcting bit errors such as Golay, Hamming, or Reed-Solomon codes. The RSSI determination function 403 and threshold comparison and range determination function 405 may comprise separate known hardware circuits or software algorithms. The digital-to-analog converter 404 may comprise a voice-band coder/decoder (CODEC) circuit. The speech analyzer 409 may comprise a hardware circuit or software algorithm capable of detecting unvoiced or near-silent periods in an audio speech signal.

A received signal is acquired via the antenna 400 and passed to the digital receiver 401 where the digital data stream is recovered. This digital data stream is then routed to the error correction and BER determination function 402 and the RSSI determination function 403. The error correction and BER determination function 402 performs the error correction decoding function where bit errors are detected and, if possible, corrected. The number of errors detected in the decoding function can be directly mapped to a recovered bit error rate, hereafter referred to as $BER_{Errors}$. An example of this is shown in the first two columns of Table 1a.

TABLE 1a

| Number of Errored Bits | $Ber_{Errors}$ | Range Indication Level |
|---|---|---|
| 0 | 0 to 3% | A |
| 1 | 4 to 5% | B |
| 2 | 6 to 7% | C |
| 3 | 8 to 9% | D |
| ≧4 | ≧10 | E |

For example, if 1 error is detected in a given code word, this can be mapped to a 4–5% BER; 3 errors can be mapped to an 8–9% BER. It is understood that the mapping of number of errors detected to a BER is dependent upon the error correction code used. Simultaneous to error correction, the RSSI determination function 403 extracts the RSSI information from the digital data stream. Typically, this information will be embedded within the digital data stream by the digital receiver 401 during the recovery process. In a manner similar to the BER mapping of the number of errors detected, the RSSI information can also be mapped to a BER level, hereafter referred to as $BER_{RSSI}$, as shown in the first two columns of Table 1b.

TABLE 1b

| Number of Errored Bits | $Ber_{RSSI}$ | Range Indication Level |
|---|---|---|
| 0 0 0 0 | 0 to 3% | A |
| 0 0 0 1 | 4 to 5% | B |
| 0 0 1 0 | 6 to 7% | C |
| 0 0 1 1 | 8 to 9% | D |
| X 1 X X | ≧10 | E |

X = don't care

Assuming a binary representation for the RSSI, a binary 1 RSSI would map to a 4–5% BER; RSSI values greater than or equal to binary 4 would map to a ≧10% BER.

The $BER_{Errors}$ and $BER_{RSSI}$ information is then routed to the threshold comparison and range determination function 405. The threshold comparison and range determination function 405 compares either or both of the $BER_{Errors}$ and $BER_{RSSI}$ information to at least one predetermined threshold. From this comparison with the at least one predetermined threshold, a range indication is derived. This can be seen in the last two columns of Tables 1a and 1b. For example, if a $BER_{Errors}$ of 4–5% and a $BER_{RSSI}$ of 6–7% are found, a "B": range indication is selected if only $BER_{Errors}$ is used, a "C" range indication is selected if only $BER_{RSSI}$ is used, and finally, an intermediate "BC" range indication may be selected if both $BER_{Errors}$ and $BER_{RSSI}$ are used. The use of the labels "A" through "E" could be substituted with any set of symbols to indicate the relative range levels. It is further understood that the $BER_{Errors}$ and $BER_{RSSI}$ values for the last several code words can be stored in memory and used to provide a more stable range indication, through the use of averaging for example.

Having determined a range indication, this information may be presented to the user in a fashion which does not detract from the audio quality of the message. A preferred embodiment for this indication is shown in FIG. 4.

This technique utilizes the simulated analog RF channel noise generator 407 to add a selected level of analog noise to the audio being sent to the speaker. The level of additive analog noise is determined by the range indication. Thus, audio derived from a given code word or a given set of code words would be interleaved with noise at an audio level proportional to their respective range indications. As the range indication rises (that is, indicates a larger distance from the transmitter), a higher level of analog noise is combined with the audio. Using the speech analyzer 409 to detect unvoiced or near silent periods of speech, the analog noise is only added via the audio summer during gaps in the speech, so as not to disrupt the received audio. In this manner, the introduction of the injected noise gives the impression that a weaker signal is being received, and that the coverage area outer limit is approaching, while not interfering with the content of the message.

The present invention provides an indication of the approaching limits of a given coverage area. By indicating to a user, through the controlled addition of non-intrusive noise simulating the performance of an analog system, that a given coverage area's outer limits are approaching, the user may react accordingly before communications become unintelligible or lost entirely. These indications are initiated by the detection of fluctuating BER and RSSI levels.

What is claimed is:

1. A method for a communication unit to alert a user, in such a manner so as not to degrade audio quality, when the communication unit is approaching limits of a transmitting source's coverage area, the method comprises the steps of:

a) monitoring, by the communication unit, error correction of received digital signals, wherein the received digital signals are transmitted by the transmitting source;

b) determining, by the communication unit, results of the error correction;

c) comparing, by the communication unit, the results of the error correction with a first predetermined threshold, wherein the first predetermined threshold is set within a range of optimal error correction rate to non-operable error correction rate; and d) generating, by the communication unit, an indication that the results of the error correction exceeds the first predetermined threshold such that the user of the communication unit is alerted that the communication unit is approaching the limits of the transmitting source's coverage area, where the indication is a simulated analog RF channel noise signal.

2. The method of claim 1, step (c) further comprises comparing the results of the error correction with a predetermined number of thresholds, wherein each of the predetermined number of thresholds is set within the range of optimal error correction rate to non-operable error correction rate.

3. The method of claim 2, step (d) further comprises generating multiple indications, wherein each of the multiple indications indicates when the results of the error correction exceeds a corresponding one of the predetermined number of thresholds.

4. The method of claim 3, including a step of regulating an audio level of the simulated analog RF channel noise signal presented to the user based on range indications.

5. The method of claim 4, including a step of controlling the simulated analog RF channel noise signal such that it is mixed with user audio during quiet or unvoiced periods of time.

6. An RF communication unit including a circuit that indicates approaching limits of a coverage area, the circuit comprises:

error monitoring means for monitoring error correction of received digital signals;

determining means, operably coupled to the error monitoring means, for determining results of the error correction;

comparing means, operably coupled to the determining means, for comparing the results of the error correction with a first predetermined threshold, wherein the first predetermined threshold is set within a range of optimal error correction rate to non-operable error correction rate;

generating means, operably coupled to the comparing means, for generating an indication which indicates when the results of the error correction exceeds the first predetermined threshold, where the indication is a simulated analog RF channel noise signal.

7. The RF communication unit of claim 6, the comparing means further functions to compare the results of the error correction with a predetermined number of thresholds, wherein each of the predetermined number of thresholds is set within the range of optimal error correction rate to non-operable error correction rate.

8. The RF communication unit of claim 7, the generating means further functions to generate multiple indications, wherein each of the multiple indications indicate when the results of the error correction exceeds a corresponding one of the predetermined number of thresholds.

* * * * *